US008194090B2

(12) United States Patent
Sato

(10) Patent No.: US 8,194,090 B2
(45) Date of Patent: Jun. 5, 2012

(54) METHOD OF CONTROLLING FRAME MEMORY, MEMORY CONTROL CIRCUIT, AND IMAGE PROCESSING APPARATUS INCLUDING THE MEMORY CONTROL CIRCUIT

(75) Inventor: Shinsuke Sato, Chiba (JP)

(73) Assignee: Kawasaki Microelectronics, Inc., Chiba (JP)

( * ) Notice: Subject to any disclaimer, the term of this patent is extended or adjusted under 35 U.S.C. 154(b) by 630 days.

(21) Appl. No.: 12/318,994

(22) Filed: Jan. 14, 2009

(65) Prior Publication Data

US 2009/0184971 A1 Jul. 23, 2009

(30) Foreign Application Priority Data

Jan. 18, 2008 (JP) .................................... 2008-9203

(51) Int. Cl.
*G09G 5/36* (2006.01)
*G06F 12/00* (2006.01)
*G06F 12/06* (2006.01)

(52) U.S. Cl. ......................... 345/545; 345/564; 345/572

(58) Field of Classification Search ........................ None
See application file for complete search history.

(56) References Cited

U.S. PATENT DOCUMENTS 4,482,979 A 11/1984 May
4,587,559 A 5/1986 Longacre, Jr. et al.
4,737,780 A 4/1988 Ishii
4,802,118 A 1/1989 Honda et al.
5,835,101 A * 11/1998 Otsuka ......................... 345/539
6,014,472 A * 1/2000 Minami et al. ................ 382/285
6,125,432 A 9/2000 Hanami et al.
6,496,192 B1 * 12/2002 Shreesha et al. .............. 345/540
6,768,490 B2 * 7/2004 Champion et al. ............ 345/545
7,023,413 B1 4/2006 Terashima et al.
7,205,993 B2 * 4/2007 Champion et al. ............ 345/540
7,542,010 B2 * 6/2009 Lai ................................ 345/1.1
8,064,282 B2 11/2011 Sato
2005/0280653 A1 * 12/2005 Tsukamoto .................. 345/558

FOREIGN PATENT DOCUMENTS

JP A 57-10879 1/1982
JP A 62-51095 3/1987
JP A 08-204921 8/1996

(Continued)

OTHER PUBLICATIONS

Office Action issued in U.S. Appl. No. 12/289,446; mailed Jan. 21, 2011.

(Continued)

*Primary Examiner* — Kee M Tung
*Assistant Examiner* — Leon T Cain, II
(74) *Attorney, Agent, or Firm* — Oliff & Berridge, PLC

(57) ABSTRACT

Various exemplary embodiments provide methods of controlling frame memory, memory control circuits, and image processing apparatuses including the memory control circuits. Data representing values of pixels constituting each of a plurality of frames are received in an order of the frames, and data representing values of pixels constituting a previous frame are read from the frame memory and data representing values of pixels constituting a next frame are written to the frame memory. By reading first data representing values of a portion of the pixels constituting the previous frame from the frame memory before receiving of data representing values of pixels constituting the next frame starts, a delay time before starting to output data representing values of pixels of the previous frame can be shortened.

21 Claims, 9 Drawing Sheets

FOREIGN PATENT DOCUMENTS

| | | |
|---|---|---|
| JP | A 2000-284771 | 10/2000 |
| JP | A 2000-315386 | 11/2000 |
| JP | A 2002-354429 | 12/2002 |
| JP | A 2003-68072 | 3/2003 |

OTHER PUBLICATIONS

Notice of Allowance issued in U.S. Appl. No. 12/289,446; mailed Jul. 12, 2011.

* cited by examiner

Related Art

Related Art

Related Art

METHOD OF CONTROLLING FRAME MEMORY, MEMORY CONTROL CIRCUIT, AND IMAGE PROCESSING APPARATUS INCLUDING THE MEMORY CONTROL CIRCUIT

This application claims priority from Japanese Application No. 2008-9203, filed on Jan. 18, 2008, which is hereby incorporated by reference in its entirety.

BACKGROUND

The invention relates to methods of controlling frame memories, memory control circuits that control frame memories, and image processing apparatuses that incorporate the memory control circuits. Specifically, this invention relates to methods of controlling frame memories, memory control circuits, and image processing apparatuses with shortened delay periods before starting to output data read from the frame memories.

Image processing apparatuses, such as liquid crystal display apparatuses, which include memory control circuits for controlling frame memories are known. The image processing apparatuses perform image processing based on data that represent values of pixels constituting frames. In the image processing apparatuses, data representing values of pixels constituting a plurality of frames are received with an order of the frames. Data (current data) constituting a next ((N+1)-th) frame are received and written to the frame memory and, simultaneously, data (past data) constituting a previous (N-th) frame previously written to the frame memory are read from the frame memory. Processing (image processing) is performed by comparing the past data and the current data, and data that reflects the result of the processing is output.

An amount of data to be written to the frame memory is large. Accordingly, DRAM (Dynamic Random Access Memory) such as SDRAM (Synchronous Dynamic Random Access Memory), which is inexpensive and has a large memory capacity, is advantageously used as the frame memory. SDRAM has an address space defined by row and column addresses. SDRAM is a dynamic-type random access memory that requires refreshing within a predetermined interval.

When starting data access to SDRAM, specifying a row address and further specifying a column address when a predetermined period has lapsed after specifying the row address are required. Specifying the row and column addresses is required to be repeated each time after a predetermined amount of data has been accessed. In an image processing apparatus such as a liquid crystal display apparatus, on the other hand, it is necessary to continuously output the data. Accordingly, a memory control circuit constituting an image processing apparatus includes FIFOs (First-In First-Out memories) at the input-side and the output-side of SDRAM as shown in, for example, U.S. Pat. No. 7,023,413, which is hereby incorporated by reference in its entirety.

FIG. 8 shows an exemplary construction of a conventional memory control circuit.

The memory control circuit 100 shown in FIG. 8 includes Write FIFO 102, SDRAM controller 103, and Read FIFO 104. The memory control circuit 100 controls writing of data to and reading of data from the SDRAM 110. During a period of a line within a frame, reading of past data and writing of current data representing values of pixels constituting the line are performed under a control of the memory control circuit 100. In practice, during a first half of the period of the line, past data PD previously stored in SDRAM 110 are read and output through the Read FIFO 104. Further, in the second half of the period of the line, current data CD received through Write FIFO 102 is written to SDRAM 110. Further detailed explanation will be made with reference to FIG. 9.

FIG. 9 is a timing chart showing write and read access timings of the memory control circuit to SDRAM 1110 and to Write and Read FIFOs 102 and 104 shown in FIG. 8.

FIG. 9 shows waveforms of vertical synchronizing signal VSYNC, read data enable signal RDE, write data enable signal WDE. During each of the periods that the read data enable signal RDE and the write data enable signal WDE are in 'H' level, data of pixels of one of the lines constituting a frame is input to the memory control circuit 100. FIG. 9 also shows periods of reading the past data from SDRAM 110 and writing the read data to Read FIFO 104 (Past data read) and periods of reading the past data from Read FIFO 104 and outputting the read data from the memory control circuit 100 (Past data output). FIG. 9 further shows periods of inputting the current data into the memory control circuit 100 and writing the input data to Write FIFO 102 (Current data input), and periods of reading the current data from Write FIFO 102 and writing the read data to SDRAM 110 (Current data write).

At first, vertical synchronizing signal VSYNC that indicates a partition between the frames is input. Then, read data enable signal RDE changes from 'L' level to 'H' level. As a result, reading of past data PD, which are previously stored in SDRAM 110, starts. The past data PD read from SDRAM 110 is written to Read FIFO 104. Thereafter, the past data written to the FIFO is read and output from the memory control circuit. On the other hand, current data CD input to the memory control circuit are written to Write FIFO 102. Then, after the reading of past data from SDRAM 110 is completed, the current data CD is read from Write FIFO 102 and written to SDRAM 110.

As shown in FIG. 9, data constituting a line is input to the memory control circuit 100 during a period that read data enable signal RDE and write data enable signal WDE are in 'H' level. Past data PD are written to Read FIFO 104 during the first half of the period, and current data CD are read from Write FIFO 102 and written to SDRAM 110 during the second half of the same period. In truth, however, reading of current data CD from Write FIFO 102 and writing of the current data CD to SDRAM 110 are performed by also using a part of a horizontal blanking period after the changing of write data enable signal WDE to 'L' level.

The memory control circuit 100 shown in FIG. 8 starts reading of past data PD stored in SDRAM 110 after read data enable signal RDE changes from 'L' level to 'H' level. After read data enable signal RDE changes to 'H' level, however, there is a delay time, or latency, before starting to read past data PD. Accordingly, an image processing apparatus, which incorporates the memory control circuit 100 and performs processing (image processing) by comparing the current data and the past data, suffers from the following problems.

An image processing circuit in a liquid crystal display apparatus, which is an example of the image processing apparatus, performs image processing based on past data of a pixel at a certain position (or coordinates) in a previous frame and current data of the pixel at the same position in the next (or current) frame. The image processing is performed, for example, in order to improve the response speed of the liquid crystal display, and data reflecting the result of the processing is output.

In order to perform such a processing, the past data of a pixel and the current data of the same pixel are required to be input simultaneously. That is, a first delay period until the past data is read from the SDRAM 110 and input to the image processing circuit and a second delay period until the current data is input to the image processing circuit should be made equal with each other. Accordingly, an image processing apparatus generally includes a delay circuit, such as a shift register or a FIFO, to delay the current data during the period that the past data is read from the SDRAM. When the delay period for reading the past data is long, a larger shift register is required.

In general, the delay period for reading data from SDRAM is a sum of $t_{RCD}$ and CAS latency. Here, $t_{RCD}$ is a delay period between row address strobe signal and column address strobe signal measured by the number of clocks. CAS latency is a delay period between input of read command to output of read data measured by the number of clocks. In reality, it is difficult to directly input data to Read FIFO 104 after outputting the data from SDRAM 110 due to a difficulty in the timing adjustment. Accordingly, two or three stages of flip-flops are inserted between SDRAM and Read FIFO. As a result, start of output of the data from the memory control circuit 100 is further delayed.

For example, when an SDRAM with $t_{RCD}$=3 and CAS latency=3 is used and two stages of flip-flops are inserted, 8 stages of flip-flops are needed to construct the shift-register. That is, when each of RGB values of a pixel is represented by 10-bit data, and two-channel parallel processing is performed, 8×10×2=160 flip-flops are needed for each of RGB values.

As explained above, a conventional memory control circuit 100 shown in FIG. 8 has a problem that a delay period from the start of inputting current data to the start of outputting past data stored in SDRAM 110 is long. Accordingly, in an image processing apparatus including the conventional memory control circuit 100, delaying the current data for a long period is required and, as a result, the size of the shift-register becomes large.

SUMMARY

In order to address the problems described above, an exemplary object of this invention is to provide methods of controlling frame memories and memory control circuits with shortened delay times to start outputting past data, which represent values of pixels constituting a previous frame, previously stored in a frame memory. Another exemplary object of this invention is to provide image processing apparatuses including the memory control circuits having shortened delay times to start outputting the past data.

Exemplary embodiments according to this disclosure provide methods of controlling frame memories using memory control circuits. The methods include receiving data representing values of pixels constituting each of a plurality of frames in an order of the frames, and supplying the data to the frame memory; generating address signals that specify addresses of the frame memory to be accessed and control signals that command reading from or writing to the frame memory, and supplying generated address and control signals to the frame memory such that data representing values of pixels constituting a previous frame previously written to the frame memory are read from the frame memory and data representing values of pixels constituting a next frame next to the previous frame are written to the frame memory. The generating and supplying are performed such that first data representing values of a portion of the pixels constituting the previous frame are read from the frame memory before the receiving of data representing values of pixels constituting the next frame starts.

According to various exemplary embodiments, the methods may further include receiving a synchronizing signal before the receiving of data representing values of pixels constituting the next frame starts. The generating and supplying may include, when the synchronizing signal is received, generating a first address signal that specifies an initial address and a first control signal that commands reading, and supplying the first address and control signals such that the frame memory reads the first data from a first range of addresses starting from the initial address.

According to various exemplary embodiments, each of the plurality of frames may include a plurality of lines, and the receiving may include receiving data representing values of pixels constituting each of the plurality of lines in an order of the lines. The first data may represent values of pixels constituting a first portion of a first one of the plurality of lines of the previous frame; and the generating and supplying may be performed such that data representing values of remaining pixels constituting a remaining portion of the first one of the plurality of lines of the previous frame and data representing values of pixels constituting the first portion of a second one of the plurality of lines of the previous frame are read during the receiving of data representing values of pixels constituting a first one of the plurality of lines of the next frame.

According to various exemplary embodiments, the methods may further include receiving a synchronizing signal before the receiving of data representing values of pixels constituting the next frame starts. The generating and supplying may include: i) when the synchronizing signal is received, generating a second address signal that specifies an initial address and a second control signal that commands reading, and supplying the second address and control signals such that the frame memory reads the first data from a second range of addresses including a first number of the addresses required to store the first data starting from the initial address; and ii) after the receiving of data representing values of pixels constituting the first one of the plurality of lines of the next frame starts, generating at least a third address signal that specifies a starting address next to the second range of addresses and a third control signal that commands reading and supplying the third address and control signals such that the frame memory reads data from a third range of addresses including a specified number of addresses required to store data representing values of pixels constituting one of the plurality of lines starting from the starting address.

According to various exemplary embodiments, the generating and supplying may further include: after the receiving of data representing values of pixels constituting each of a second to a last one of the plurality of lines of the next frame starts, generating at least a fourth address signal that specifies a second starting address next to a range of addresses read after the receiving of data representing values of pixels constituting a previous one of the plurality of lines of the next frame starts and a fourth control signal that commands reading, and supplying the fourth address and control signals such that the frame memory reads data from a fourth range of addresses including the specified number of addresses starting from the second starting address.

According to various exemplary embodiments, the generating and supplying may further include: i) after data representing a value of a last one of the pixels constituting a last one of the plurality of lines of a frame previous to the previous frame is read, generating a fifth address signal that specifies an initial address and a fifth control signal that commands reading, and supplying the fifth address and control signals such that the frame memory reads data from a fifth range of addresses including a first number of addresses required to store the first data starting from the initial address; and ii) after the receiving of data representing values of pixels constituting the first one of the plurality of lines of the next frame starts, generating at least a sixth address signal that specifies a third starting address next to the fifth range of addresses and a sixth control signal that commands reading, and supplying the sixth address and control signals such that the frame memory reads data from a sixth range of addresses including a specified number of addresses required to store data representing values of pixels constituting one of the plurality of lines starting from the third starting address.

According to various exemplary embodiments, the methods may further include: storing the first data read from the frame memory before the receiving of data representing values of pixels constituting the next frame starts in a FIFO; and reading the first data after the receiving of data representing values of pixels constituting the next frame starts from the FIFO.

According to various exemplary embodiments, the methods may further include outputting the first data read from the FIFO to a processing circuit; and delaying the data representing values of pixels constituting the next frame to produce a delayed data, and outputting the delayed data to the processing circuit such that the processing circuit starts to receive the first data and the delayed data simultaneously.

Exemplary embodiments according to this disclosure provide memory control circuits that generate address signals for specifying addresses of a frame memory to be accessed and control signals for commanding reading from or writing to the frame memory. The memory control circuits include a data input terminal that receives data representing values of pixels constituting each of a plurality of frames in an order of the frames, a data supply terminal that supplies the data to the frame memory; an address terminal that supplies the address signals to the frame memory, and a control terminal that supplies the control signals to the frame memory. The memory control circuit generates and supplies the address and control signals to the frame memory such that: data representing values of pixels constituting a previous frame previously written to the frame memory are read from the frame memory and data representing values of pixels constituting a next frame next to the previous frame are written to the frame memory; and first data representing values of a portion of the pixels constituting the previous frame are read from the frame memory before the memory control circuit starts to receive the data representing values of pixels constituting the next frame.

Exemplary embodiments according to this disclosure provide image processing apparatuses including a frame memory; a memory control circuit that generate address signals for specifying addresses of the frame memory to be accessed and control signals for commanding reading from or writing to the frame memory, and an image processing circuit. The memory control circuit includes: a data input terminal that receives data representing values of pixels constituting each of a plurality of frames in an order of the frames, a data supply terminal that supplies the data to the frame memory; an address terminal that supplies the address signals to the frame memory, and a control terminal that supplies the control signals to the frame memory. The memory control circuit generates and supplies the address and control signals to the frame memory such that data representing values of pixels constituting a previous frame previously written to the frame memory are read from the frame memory and data representing values of pixels constituting a next frame next to the previous frame are written to the frame memory. The image processing circuit receives the data representing values of pixels constituting the next frame and the data representing values of pixels constituting the previous frame read from the frame memory, and performs processing using both of the data. The memory control circuit further generates and supplies the address and control signals to the frame memory such that first data representing values of a portion of the pixels constituting the previous frame are read from the frame memory before the memory control circuit starts to receive the data representing values of pixels constituting the next frame.

According to various exemplary embodiments, the memory control circuit may further include a FIFO; and the memory control circuit stores the first data read from the frame memory before the memory control circuit starts to receive the data representing values of pixels constituting the next frame in the FIFO, and reads the first data after the memory control circuit starts to receive the data representing values of pixels constituting the next frame from the FIFO.

According to various exemplary embodiments, the image processing apparatus may further include a delay circuit that delays the data representing values of pixels constituting the next frame to produce a delayed data. The image processing circuit may start to receive the delayed data and the first data read from the FIFO simultaneously.

BRIEF DESCRIPTION OF THE DRAWINGS

Various exemplary details of methods of controlling frame memories, memory control circuits, and image processing apparatuses are described with reference to the following figures, wherein.

DETAILED DESCRIPTION OF EMBODIMENTS

Exemplary embodiments of this disclosure will be explained with reference to attached drawings.

Figure 1:
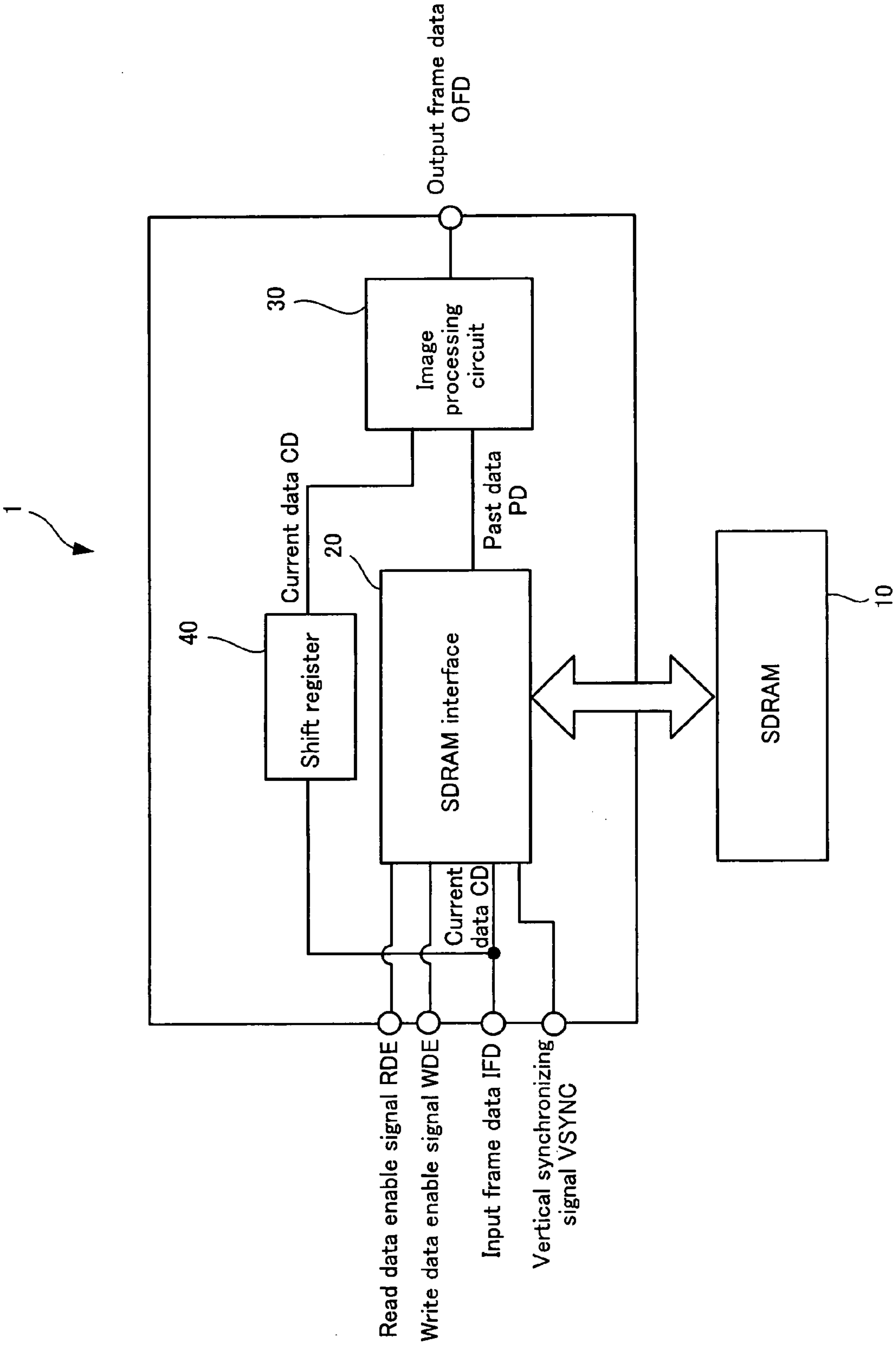
FIG. 1 is a schematic drawing showing a construction of an exemplary image processing apparatus.

FIG. 1 is a schematic drawing showing a construction of an exemplary embodiment of an image processing apparatus according to this disclosure.

The exemplary image processing apparatus 1 shown in FIG. 1 includes SDRAM 10, a SDRAM interface 20, an image processing circuit 30, and a shift register 40.

The exemplary image processing apparatus 1 receives data (input frame data IFD) that represent values of pixels constituting each of a plurality of frames in the order of the frames. Then, the exemplary image processing apparatus performs image processing based on the input data and output data (output frame data OFD) that represent the values of the pixels constituting each of a plurality of processed frames in the order of the frames. The values of the pixels may be, for example, brightness values or color difference values of the pixels.

SDRAM 10, which is used as frame memory, has an address space defined by column and row addresses. SDRAM 10 is a dynamic random access memory that requires periodic refreshes. Refreshing of SDRAM 10 is explained in, for example, a co-pending application "Method of accessing synchronous dynamic random access memory, memory control circuit, and memory system including the same" filed on Oct. 28, 2008 (U.S. patent application Ser. No. 12/289,446), which is incorporated herein by reference in its entirety. To start accessing SDRAM 10, a row address is specified and then a column address is specified when a certain period has lapsed after specifying the row address. Further, a row address and a column address are specified each time after a certain amount of data has been read or written.

The SDRAM interface 20 is an exemplary embodiment of a memory control circuit. Read data enable signal RDE, write data enable signal WDE, and vertical synchronizing signal VSYNC are input to the SDRAM interface 20. Input frame data IFD is also input to the SDRAM interface 20. Thereby, the SDRAM interface 20 writes data (current data CD) that represent values of pixels constituting a frame that is currently input (current frame) to SDRAM 10. Simultaneously, data (past data PD) that represent values of pixels constituting a previous frame (past frame), which have been previously written to SDRAM 10, are read and output to the image processing circuit 30.

Read data enable signal RDE and write data enable signal WDE are utilized to control the timing of reading past data PD from and writing current data CD to SDRAM 10, respectively. In this exemplary embodiment, read data enable signal RDE and write data enable signal WDE become valid ('H' level) simultaneously. Usually, input frame data IFD is input together with a data valid signal (not shown) that indicates periods during which valid data are input. Accordingly, read data enable signal RDE and write data enable signal WDE may be generated from the data valid signal.

The input frame data IFD is also input to the shift register 40. The shift register 40 delays the input frame data IFD for a specified period and outputs the delayed input frame data to the image processing circuit 30 at the same timing that the SDRAM interface 20 outputs the past data PD. That is, the shift register 40 is provided as a delay circuit for adjusting the latency of inputting the current data CD to the image processing circuit 30 and the latency of inputting the past data PD from the SDRAM interface 20 read from SDRAM 10 to the image processing circuit 30, with each other.

The image processing circuit 30 receives current data CD from the shift register 40 and past data PD from the SDRAM interface 20 read from the SDRAM 10, performs image processing based on the both data, and outputs processed output frame data OFD.

Figure 2:
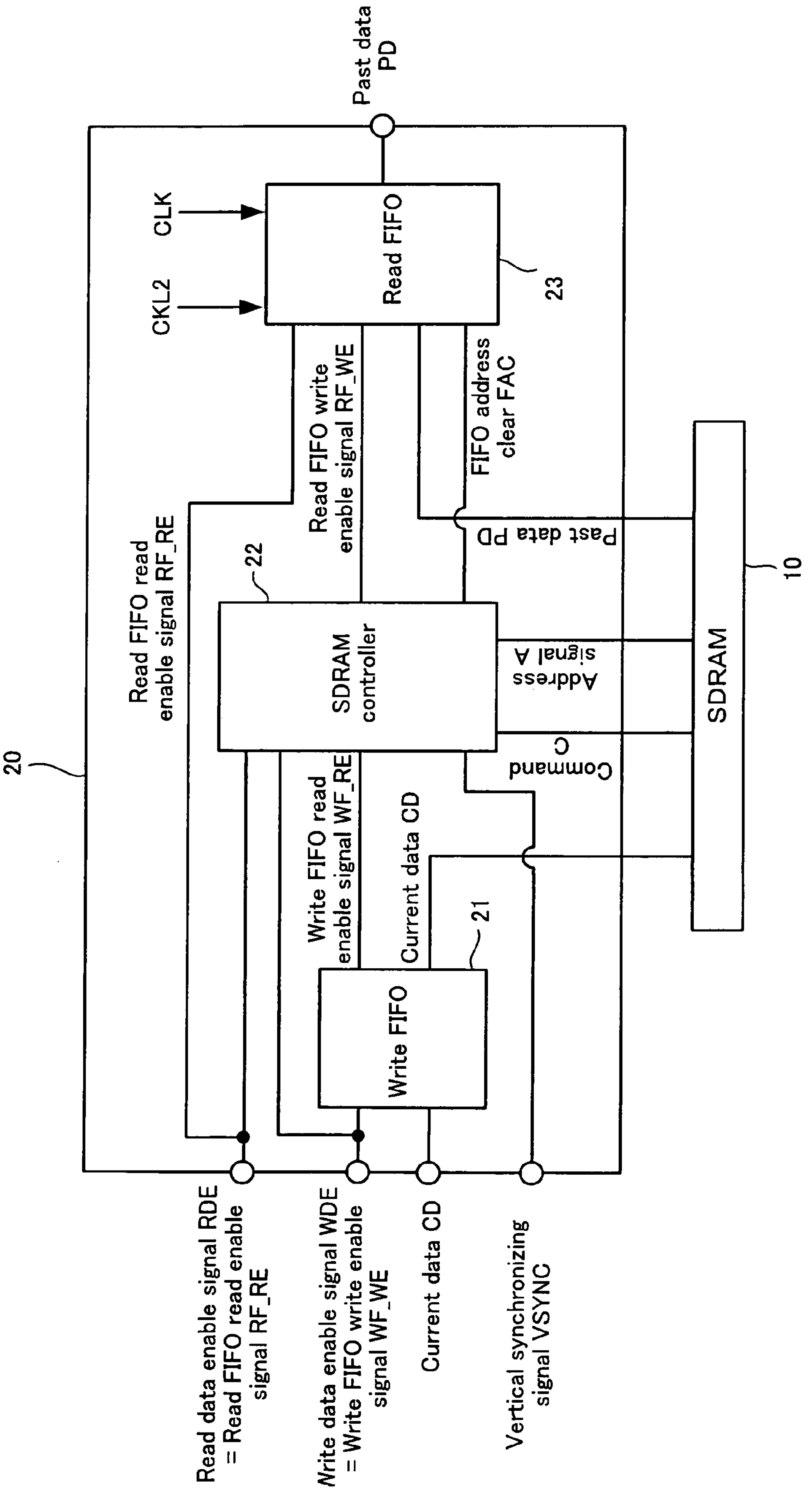
FIG. 2 is a schematic drawing showing an exemplary construction of the SDRAM interface shown in FIG. 1.

FIG. 2 is a schematic drawing showing an exemplary construction of the SDRAM interface shown in FIG. 1.

The exemplary SDRAM interface 20 includes Write FIFO 21, SDRAM controller 22, and Read FIFO 23.

Figure 3:
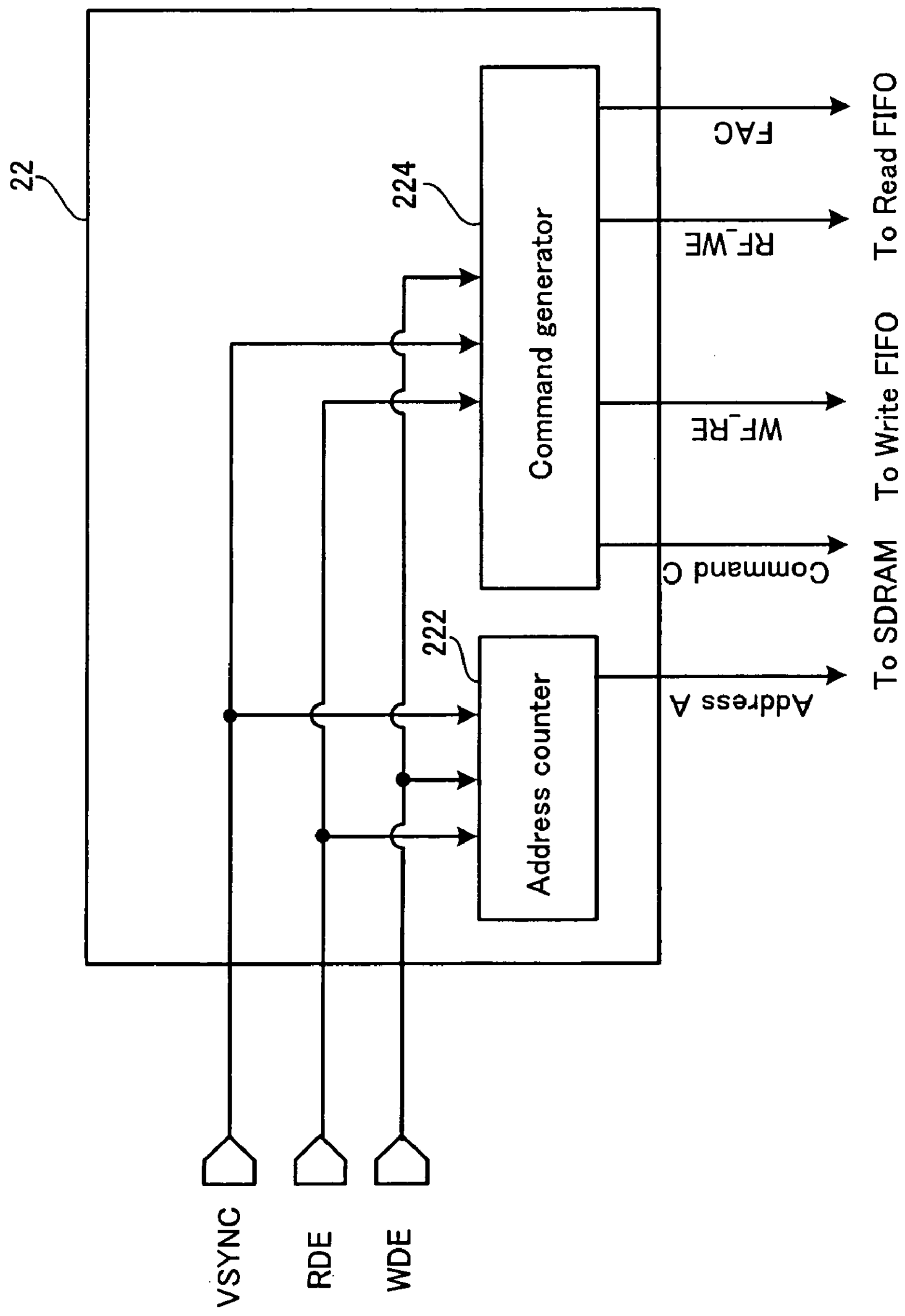
FIG. 3 is a schematic drawing showing an exemplary construction of the SDRAM controller shown in FIG. 2.

FIG. 3 is a schematic drawing showing an exemplary construction of the SDRAM controller 22.

The SDRAM controller 22 performs controls for writing current data CD input through Write FIFO 21 to SDRAM 10, and for reading past data PD previously written to SDRAM 10 and outputting the read past data PD through Read FIFO 23. The SDRAM controller 22 includes an address counter unit 222 for generating address signal A that specify the addresses of SDRAM 10 to be accessed. The SDRAM controller 22 further includes a command generator unit 224 for generating control signals (command C) that control writing to or reading from SDRAM 10. The generated address and controls signals are supplied to the SDRAM 10 in order to perform writing of current data CD and reading of past data PD.

Prior to the start of inputting current data CD constituting the current frame, SDRAM interface 20 generates and supplies address signal A and command C to SDRAM 10 so that past data PD representing values of a portion of pixels constituting the previous frame are read. As a result, the past data PD of a portion of pixels constituting the previous frame are read ahead of the start of inputting the current data CD. The read-ahead past data PD are temporarily stored in Read FIFO 23. Then, after the start of inputting the current data CD, the temporarily stored past data PD are read from Read FIFO 23 and output from the SDRAM interface 20.

In order to control this operation, the SDRAM controller 22 receives vertical synchronizing signal VSYNC, read data enable signal RDE, and write data enable signal WDE, and generates and supplies address signal A and command signal C to SDRAM 10 at timings determined by the received signals. Moreover, the SDRAM controller 22 generates and supplies the following signals to respective FIFOs: i) Write FIFO read enable signal WF_RE that directs reading from Write FIFO 21, ii) Read FIFO write enable signal RF_WE that directs writing to Read FIFO 23, and iii) FIFO address clearing signal FAC that directs clearing of the address of Read FIFO 23. Although not shown on FIG. 2, the SDRAM controller 22 also supplies a signal to direct clearing of the address of Write FIFO 21. Further, Write FIFO 21 is supplied with Write FIFO write enable signal WE_WE that directs writing to Write FIFO. Read FIFO 23 is supplied with Read FIFO read enable signal RF_RE that directs reading from the Read FIFO 23.

In the exemplary SDRAM interface 20, write data enable signal WDE is supplied as a Write FIFO write enable signal WE_WE, and read data enable signal RDE is supplied as a Read FIFO read enable signal RF_RE. However, it is possible to provide a circuit to generate Write FIFO write enable signal WE_WE and the Read FIFO read enable signal RF_RE from the write data enable signal WDE and the read data enable signal RDE, respectively. For example, it is possible to generate Read FIFO read enable signal RF_RE by delaying the read data enable signal RDE for a period of read latency of Read FIFO 23.

Read FIFO 23 is supplied with reference clock CLK and double-frequency clock CLK2 that has twice the frequency of the reference clock. Although not shown in FIG. 2, Write FIFO 21 is also supplied with the reference clock CLK and the double-frequency clock CLK2, and SDRAM 10 is supplied with the double-frequency clock CLK2 through the SDRAM controller 22.

The reference clock CLK is a clock signal with which the current data CD is input to the SDRAM interface 20 and the past data PD is output from the SDRAM interface 20. Writing of current data CD to the Write FIFO 21 and reading of past data PD from the Read FIFO 23 are also performed by using the reference clock CLK. On the other hand, reading of current data CD from the Write FIFO 21 and writing of read current data to the SDRAM 10, and reading of past data PD from the SDRAM 10 and writing of read past data to the Read FIFO 23 are performed by using the double-frequency clock CLK2.

Figure 4:
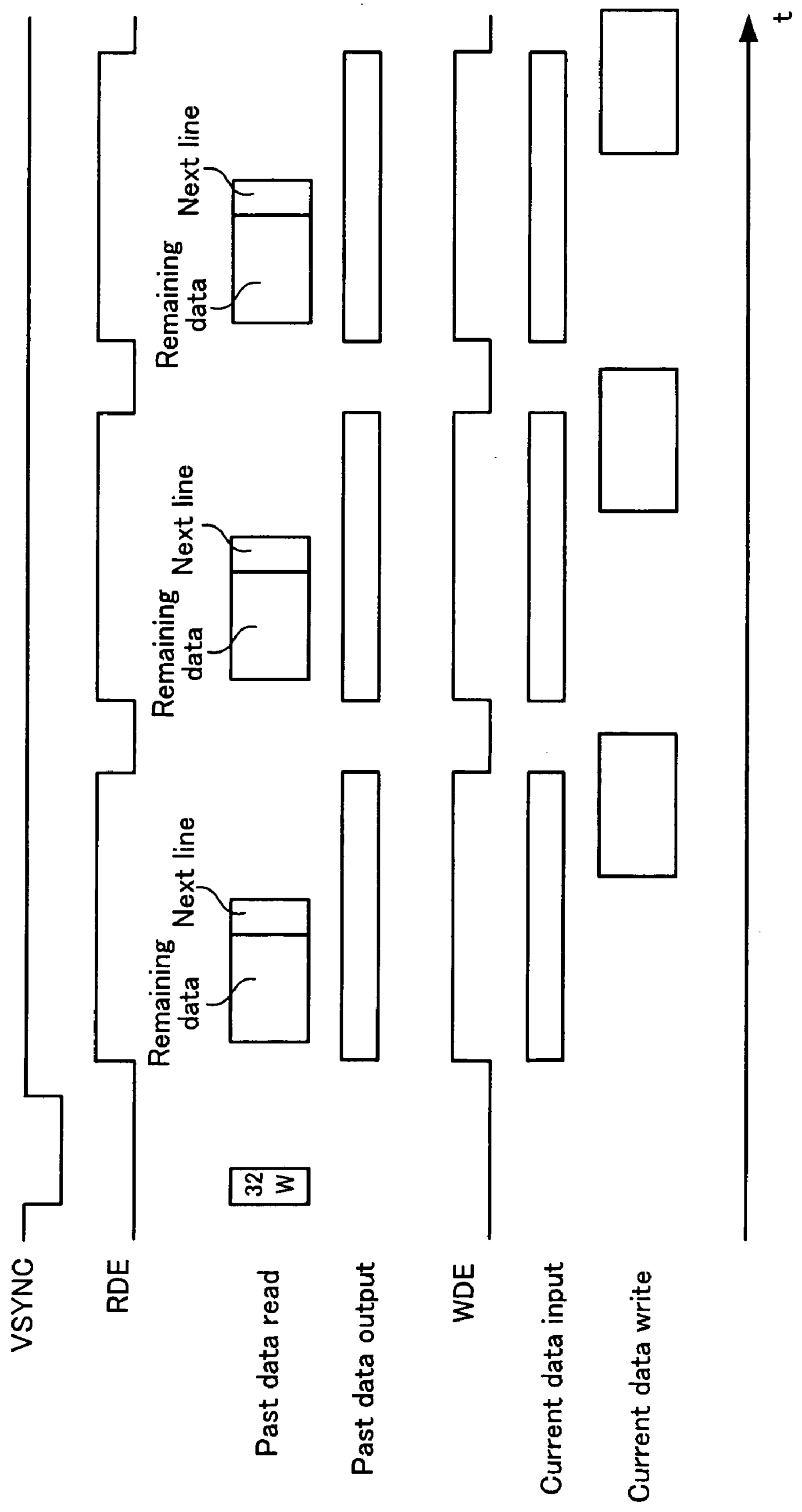
FIG. 4 is a timing chart showing access timings in the exemplary SDRAM interface shown in FIG. 2.

FIG. 4 is a timing chart showing timings that the SDRAM interface 20 shown in FIG. 2 accesses SDRAM 10, Write FIFO 21, and Read FIFO 23.

FIG. 4 shows waveforms of vertical synchronizing signal VSYNC, read data enable signal RDE, and write data enable signal WDE. In the example shown on FIG. 4, data valid signal ((not shown) input to the SDRAM interface 20 together with the input frame data is used as a read data enable signal RDE and a write data enable signal WDE. Accordingly, read data enable signal RDE and write data enable signal WDE become 'H' level during periods that the SDRAM interface 20 is receiving the current data CD. In practice, read data enable signal RDE and write data enable signal WDE become 'H' level during each period that the SDRAM interface 20 is receiving data that represent values of pixels constituting each line of a frame.

FIG. 4 further shows the following periods: i) periods of reading past data from SDRAM 10 and writing the read past data to Read FIFO 23 (past data read), ii) periods of reading past data from Read FIFO 23 and outputting the read past data from SDRAM interface 20 (past data output), iii) periods of inputting current data to SDRAM interface 20 and writing the input current data to Write FIFO 21 (current data input), and iv) periods of reading current data from Write FIFO 21 and writing the read current data to SDRAM 10 (current data write). The periods of past data read and past data output correspond to the periods that Read FIFO write enable signal RF_WE and Read FIFO read enable signal. RF_RE, respectively, are supplied to the Read FIFO 23. The periods of current data input and current data write correspond to the periods that Write FIFO write enable signal WF_WE and Write ITFO read enable signal WF_RE, respectively, are supplied to Write FIFO 21.

As shown in FIG. 4, vertical synchronizing signal VSYNC supplied to the exemplary SDRAM interface 20 has a falling edge prior to the start of inputting current data, or the change of read data enable signal RDE and write data enable signal WDE to 'H' level. The SDRAM interface 20 detects the change of vertical synchronizing signal VSYNC to 'L' level and read a portion of the past data from SDRAM 10. In practice, the SDRAM interface 20 reads data representing values of pixels in a first portion from the start (32 words from the start, in the example shown in FIG. 4) of the first line in the previous frame from SDRAM 10.

When the first portion of the past data is read, reading of the past data stops. The past data read-ahead from SDRAM 10 (the first data) is stored in Read FIFO 23, but reading from Read FIFO 23 or outputting from the SDRAM interface 20 is not performed prior to the start of inputting current data to the SDRAM interface 20.

Thereafter, after read data enable signal RDE changes to 'H' level and the input of current data starts, reading of the past data from SDRAM 10 re-starts. In this stage, reading of past data of pixels in the first line is performed for the remaining data excluding the read-ahead 32 words of data.

During the first one of the periods that read data enable signal RDE becomes 'H' level, which corresponds to the input of current data of pixels in the first line, reading of the first portion of past data (i.e., 32 words from the start) of pixels in the second line is further performed following the reading of past data of the remaining pixels (remaining data) in the first line. This read-ahead operation of past data of pixels in the second line is performed during the period indicated as 'next line' in FIG. 4. Similarly, during each of the second and succeeding periods that read data enable signal RDE becomes 'H' level corresponding to the input of current data of pixels in the second and succeeding lines, past data of the remaining pixels in a corresponding line are read and the first portion of past data of pixels in the next line are read ahead.

While, reading of past data from Read FIFO 23 and outputting of the read data from the SDRAM interface 20 starts immediately after read data enable signal RDE changes to 'H' level. In this exemplary embodiment, read-ahead past data are already stored in Read FIFO 23 when read data enable signal RDE changes to 'H' level. Accordingly, reading of past data from Read FIFO 23 can be started without waiting for the start of reading of past data from SDRAM 10.

Exactly speaking, Read FIFO 23 also has a delay time (latency) to start reading the data. Accordingly, even in this exemplary embodiment, the output of past data starts after the delay time of Read FIFO 23. In the exemplary embodiment, however, the delay time before the start of outputting past data can be decreased compared with the conventional technique by the delay time to start outputting past data from SDRAM 10. Accordingly, when the exemplary SDRAM interface 20 is utilized to construct a data processing apparatus, a shift register 40 with reduced number of stages may be used for adjusting the timing for inputting current data to the image processing circuit 30.

In the exemplary embodiment, specifically, the first portion of past data (the first data) is read-ahead for each of the lines. Accordingly, even in the case that data of pixels constituting each of the lines in a frame are separately received, the delay time before starting to output past data of pixels in each line may be decreased.

In addition, the delay time (latency) for starting to read data from a SDRAM may be varied depending on the type of SDRAM. Accordingly, a conventional image processing apparatus requires a modification, or a change of the number of stages of the shift register 40 depending on the latency of SDRAM. In the exemplary SDRAM interface 20, on the contrary, past data may be output after a fixed delay time irrespective of the latency of SDRAM 20. Accordingly, a modification is not required even if the latency of SDRAM 20 is changed.

As shown in FIG. 4, writing of current data to Write FIFO 21 starts simultaneously with the change of write enable signal WDE to 'H' level. Further, the current data are read from Write FIFO 21 and written to SDRAM 10 after the first portion of past data of pixels in the next line are read from SDRAM 10. That is, reading of past data from SDRAM 10 and writing of current data to SDRAM 10 are performed in the earlier and later halves, respectively, of the period that read data enable signal RDE and write data enable signal WDE are in 'H' level corresponding to each line.

In order to perform reading of past data from SDRAM 10 and writing of current data to SDRAM 10 within the period that current data for each line are input, writing of data to SDRAM 10 and reading of data from SDRAM 10 are performed using the double-frequency clock CLK2. In actual, writing of current data to SDRAM 10 is not completed within the period that write data enable signal WDE is in 'H' level, or the period that current data are input, because certain delay periods are required to start reading from and writing to SDRAM 10. Accordingly, writing of current data to SDRAM 10 extends to a part of the period after the change of write data enable signal to 'L' level, i.e., a blanking period between lines.

Figure 5:
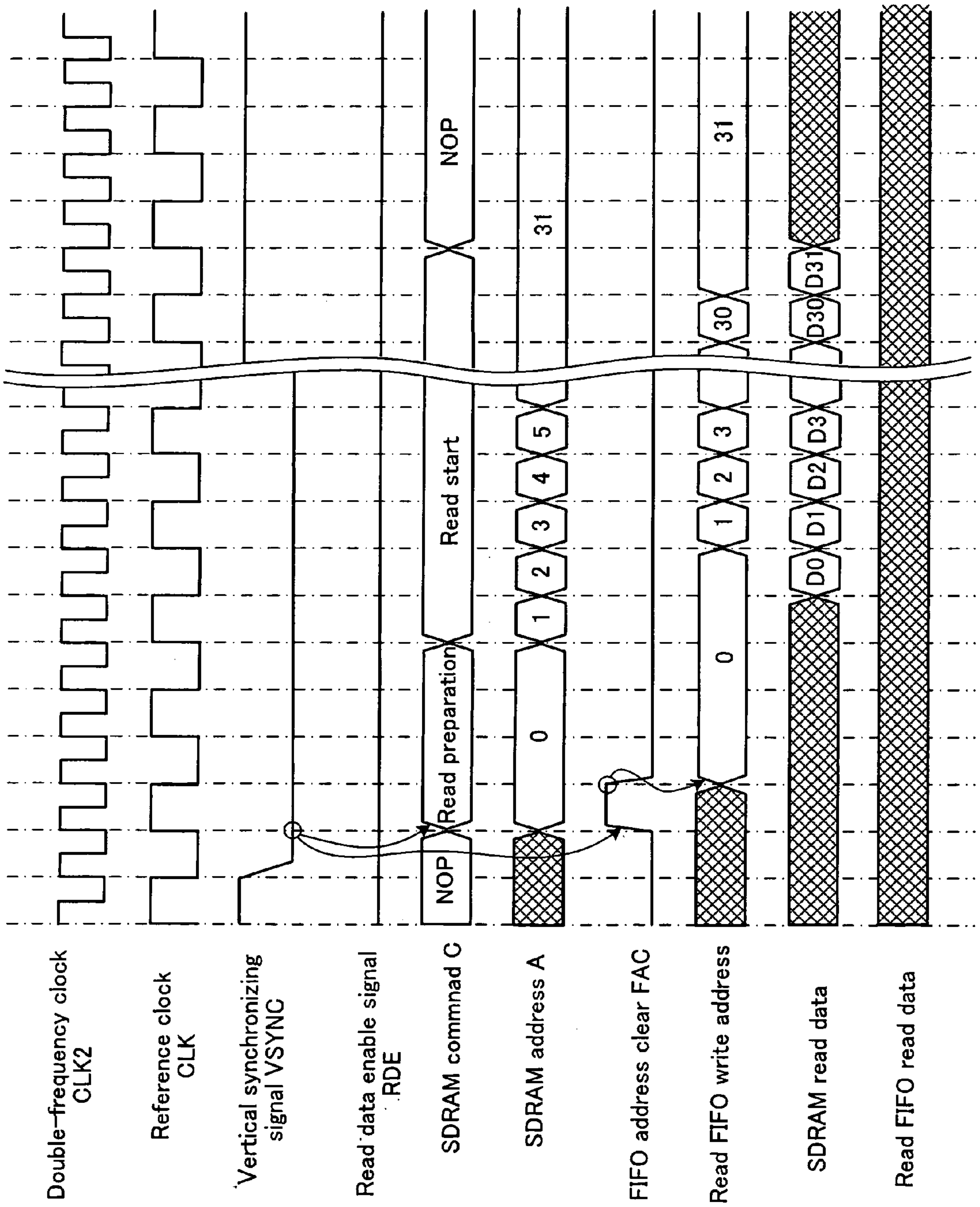
FIG. 5 is a timing chart showing operation of the exemplary SDRAM interface near a falling edge of vertical synchronizing signal.

FIG. 5 is a timing chart showing operations of the exemplary SDRAM interface 20 near the falling edge of vertical synchronizing signal VSYNC.

FIG. 5 shows waveforms of double-frequency clock CLK2, reference clock CLK, vertical synchronizing signal VSYNC, and read data enable signal RDE. Note that, however, read data enable signal RDE maintains 'L' level during the period shown. FIG. 5 also shows control signal (SDRAM command C) and address signal (SDRAM address A) generated by the SDRAM controller 22, and FIFO address clearing signal FAC generated by the SDRAM controller 22 and supplied to Read FIFO 23. FIG. 5 further shows addresses of Read FIFO 23 where the data is written, data read out from SDRAM 10 (SDRAM read data), and data output from Read FIFO 23 (Read FIFO read data).

When detecting the change of vertical synchronizing signal VSYNC to 'L' level, the SDRAM controller 22 generates and supplies a control signal (Command C) that commands read operation to SDRAM 10 during 'read preparation' period shown in FIG. 5. Simultaneously, SDRAM controller 22 clears a counter, which is provided in the address counter unit 222 for generating addresses, to an initial address (0). Further, the SDRAM controller 22 supplies an address signal that specifies the initial address to SDRAM 10.

In practice, the SDRAM controller 22 divides the initial address into row and column addresses and supplies address signals that specify respective one of the divided addresses to SDRAM 10. That is, the SDRAM controller 22 first supplies an active command and a row address to SDRAM 10 and, after an elapse of a specified period, further supplies a read command and a column address. Thereby, reading of past data from SDRAM 10 starts. That is, after a specified delay period, data D0 stored in address 0 is read. Thereafter, data D1, D2, D3 . . . stored in addresses 1, 2, 3 . . . , respectively, are read.

In fact, only an address signal A specifying the initial address (0) is supplied to SDRAM 10 and a first range of addresses (32 words) from the initial address are read by a burst read operation. That is, only by specifying the initial address, data in the initial and following successive addresses within the first ranges are read synchronously with the clock (the double-frequency clock CLK2). Thereafter, read operation is halted and the SDRAM controller 22 waits for the start of the input of the next data of pixels of the frame, or the change of read data enable signal to 'H' level.

While the burst-read of data in the first range of addresses continues, the address counter counts the double-frequency clock CLK2 and generates addresses 1 to 31. These addresses are not supplied to SDRAM 10. However, setting the address counter to the final values within the first range (31) makes it easy to generate the next address when reading the data from next to the first range of addresses.

Further, upon detecting the change of vertical synchronizing signal VSYNC to 'L' level, the SDRAM controller 22 outputs FIFO address clearing signal (FAC) for clearing the address of Read FIFO 23 to the initial address. That is, the address of Read FIFO 23 is also initialized at the clock edge (rising edge) of double-frequency clock CLK2 next to the falling edge of vertical synchronizing signal VSYNC. Accordingly, data (past data PD) read from SDRAM 10 are successively written to a range of addressed of Read FIFO 23 starting from address 0.

Note that, during the period that read data enable signal RDE is 'L' level, Read FIFO read enable signal RF_RE for directing to read data from Read FIFO 23 is not generated. Accordingly, during the period shown in FIG. 5, data D0 to D31 read out from SDRAM 10 are stored in Read FIFO 23 waiting for the change of read data enable signal RDE to 'H' level, or the start of inputting current data.

Clearing of the addresses described above may be performed with a simple circuit, because it simply clears the addresses to the initial address, and can be easily performed without adding a large circuit. Further, this exemplary embodiment ensures stable operation even when an error occurs due to noise, because the addresses are cleared in each frame.

Figure 6:
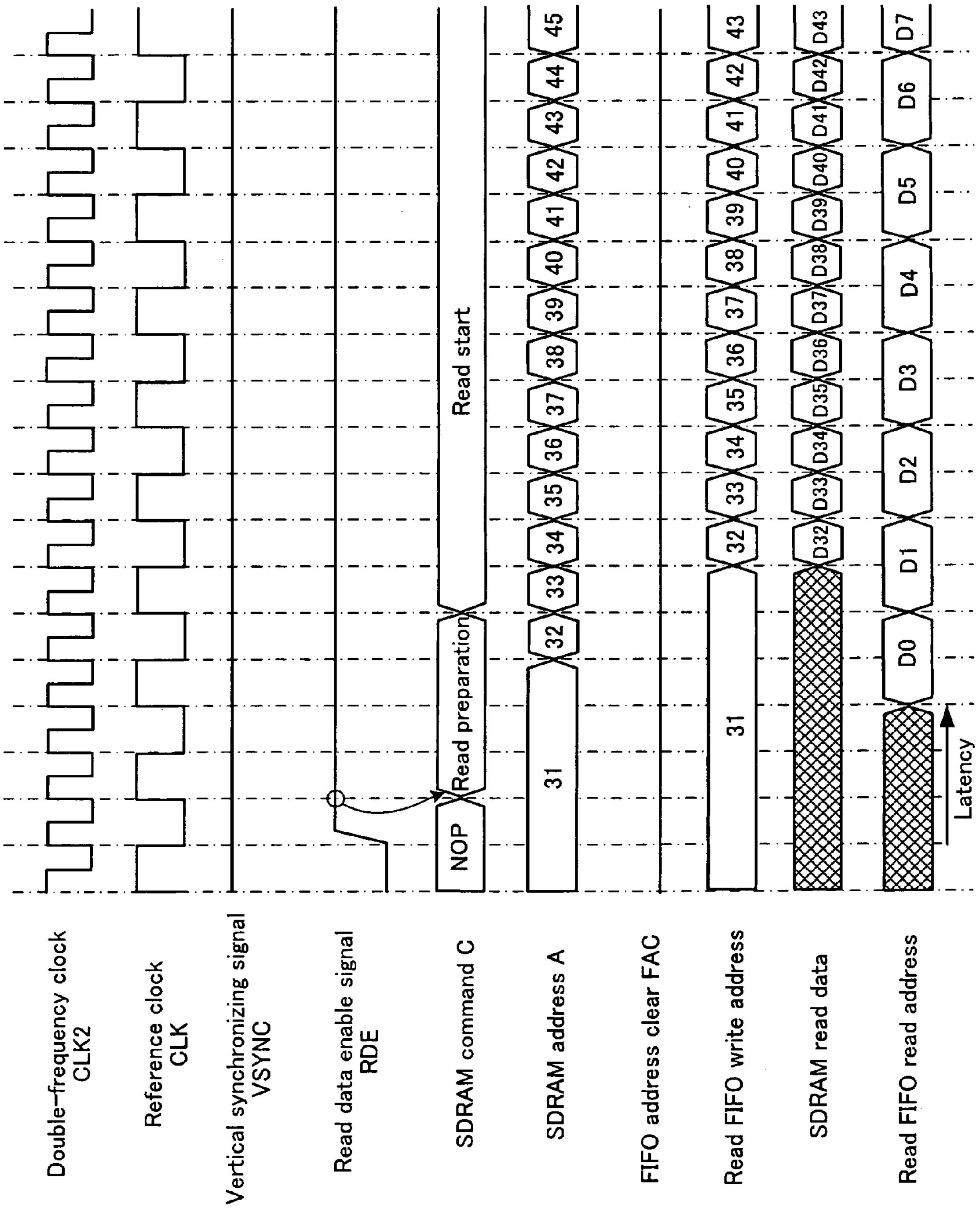
FIG. 6 is a timing chart showing operation of the exemplary SDRAM interface near a rising edge of read data enable signal.

FIG. 6 is a timing chart showing operations of the SDRAM interface 20 near the rising edge of read data enable signal RDE.

FIG. 6 shows the same signals as shown in FIG. 5. Note that, however, vertical synchronizing signal VSYNC does not have a falling edge during the period shown in FIG. 6.

In the exemplary SDRAM interface 20 shown in FIG. 2, read data enable signal RDE is supplied as a Read FIFO read enable signal RF_RE to Read FIFO. As explained above, the exemplary SDRAM interface 20 may be modified to provide a circuit to generate the Read FIFO read enable signal in, for example, the SDRAM controller 22. In this case, upon detecting the change of read data enable signal RDE to 'H' level, the SDRAM controller 22 generates and supplies Read FIFO read enable signal RF_RE to Read FIFO 23 that directs to start reading past data from Read FIFO 23. In either case, after a specified delay time, D0 and following data stored in Read FIFO 23 are read and output in the order.

At this moment, the first range (32 words) of past data (first data) read from SDRAM 10 during the period following the falling edge of vertical synchronizing signal VSYNC shown in FIG. 5 are stored in Read FIFO 23. Accordingly, it is possible to direct Read FIFO 23 to read past data immediately after the rising edge of read data enable signal RDE. As a result, it is possible to start outputting past data PD after a short delay time, and is possible to decrease the number of stages of the shift register 40 in the image processing apparatus 1.

As explained above, reading of past data from Read FIFO 23 starts after the rising edge of read data enable signal RDE. In addition, reading of past data from SDRAM 10 and wiring of read data to Read FIFO 23 also starts after the rising edge of RDE. That is, same as the operation after detecting the falling edge of vertical synchronizing signal VSYNC shown in FIG. 5, the SDRAM controller 22 generates and supplies Command C and Address A to SDRAM upon detecting the change of read data enable signal RDE to 'H' level. After the rising edge of read data enable signal RDE, however, the address counter, which reached to the final address within the first range (31) during the period shown in FIG. 5, is not cleared but generates and supplies the next address (32) to SDRAM 10 by adding 1 to the final address. Accordingly, starting from data D32 stored in the next address, past data are read from SDRAM 10 in the order and written to Read FIFO 23.

Although not shown in FIG. 6, reading of past data from SDRAM 10 and writing to Read FIFO 23 in this stage continue until data of pixels constituting an entire line are read and written. That is, the remaining data excluding the first range (first 32 words) in the same line and the data in the first range (first 32 words) in the next line are read from SDRAM 10 and written to Read FIFO 23.

During the reading of data constituting a line, the address counter continues to generate addresses by counting the double-frequency clock CLK2. Same as the period shown in FIG. 5, burst reading from SDRAM 10 is performed during the period shown in FIG. 6. Accordingly, it is not required to supply all of the generated addresses to SDRAM 10. Nonetheless, the SDRAM controller 22 supplies addresses at certain required timings, because it is impossible to read data of pixels constituting an entire line with a single burst-read operation. The SDRAM controller 22 generates and supplies Command C together with Address A at the required timings in order to re-start burst readings of data in the next range of addresses.

Thus, reading of data is performed for a specified range of addresses including a specified number of addresses required to store data representing values of pixels constituting an entire line. That is, the specified number of addresses includes a first number of addresses required to store the first data and a remaining number of addresses required to store the data representing values of remaining pixels. When each of the lines is constituted of a specified number of pixels, and one address is required to store data of each pixel, the specified number of addresses is equal to the specified number of pixels in each line.

The specified number of addresses may be different from the specified number of pixels in each line. For example, current data CD of pixels constituting each line may be compressed before writing to SDRAM to an extent that the number of addresses required to store the current data CD of pixels constituting each line is less than the number of pixels in each line.

The operation of the SDRAM controller 22 during the period that read data enable signal RDE is in 'H' level is the same as the operation of a conventional image processing apparatus, although the starting address (32) is different from that of the operation of a conventional apparatus. That is, in either case, data representing values of pixels constituting a line is read. Accordingly, no additional circuit is required.

In this exemplary embodiment, the reading of data of pixels constituting an entire line, from the starting address next to the first range to the first range in the next line, is performed for each of the lines until the final line. Accordingly, after reading the remaining data in the final line, data within the first range of addresses in the first line in the next frame are read and stored in Read FIFO 23. However, the data in the first line in the next frame read and written in this stage cannot be utilized. That is, at the falling edge of vertical synchronizing signal VSYNC before the input of data of the next frame, addresses of SDRAM 10 and Read FIFO 23 are cleared, and reading of data in the first range of addresses in the first line from SDRAM 10 and writing of the read data to Read FIFO 23 are performed again.

The prevention of performing such an unnecessary read of data of the first line is possible. That is, for example, a first counter that counts the number of lines from which the data are read and a second counter that counts the number of times, or the number of clocks, of reading data in each line can be provided to detect the timing when the data of the last pixel in the last line is read. Further, a circuit that halts the reading operation when the timing is detected by the first and the second counters may be added. In this exemplary embodiment, however, such counters and a circuit are not provided. That is, the size of circuitry is minimized by allowing the unnecessary reading.

In the exemplary embodiment described above, when the falling edge of vertical synchronizing signal VSYNC is detected, the address counter, or the read address A of SDRAM, is cleared and the first data of pixels constituting a first portion of the first line are read from SDRAM 10 and written to Read FIFO 23. It is possible to modify the procedure to skip these steps. Thereby, it becomes possible to utilize the first data of the first line of the next frame read after reading the data of the final line of the previous frame.

In this case, as explained above, a first counter that counts the number of lines from which the data are read and a second counter that counts the number of times, or the number of clocks, of reading data in each line can be provided. When the timing that the data of the last pixel in the last line is read is detected, the address counter may be cleared. Then, when the preparation for reading data is completed, the first data of the first line are read from the first range of addresses of SDRAM 10 and written to Read FIFO 23.

When the clearing of address counter upon detecting the falling edge of vertical synchronizing signal VSYNC is not performed, data are not read from correct addresses during the period that data of the first frame are inputting. However, the address counter is cleared when the timing that data of the last pixel in the last line is read is detected during the period of inputting data of the first frame. Thereafter, data are read from correct addresses. Note that, during the period that data of the first frame are inputting, data are not read from proper addresses, and the detected timing may not be the true timing that data of the last pixel is read. Nonetheless, data are read from correct addresses after the clearing of the address counter. Further note that, during the period that data of the first flame are inputting, data read from SDRAM 10 are meaningless because no valid data has been previously written to the SDRAM 10. Accordingly, it is acceptable even if data are not read from correct addresses during the period of inputting data of the first frame.

Figure 7:
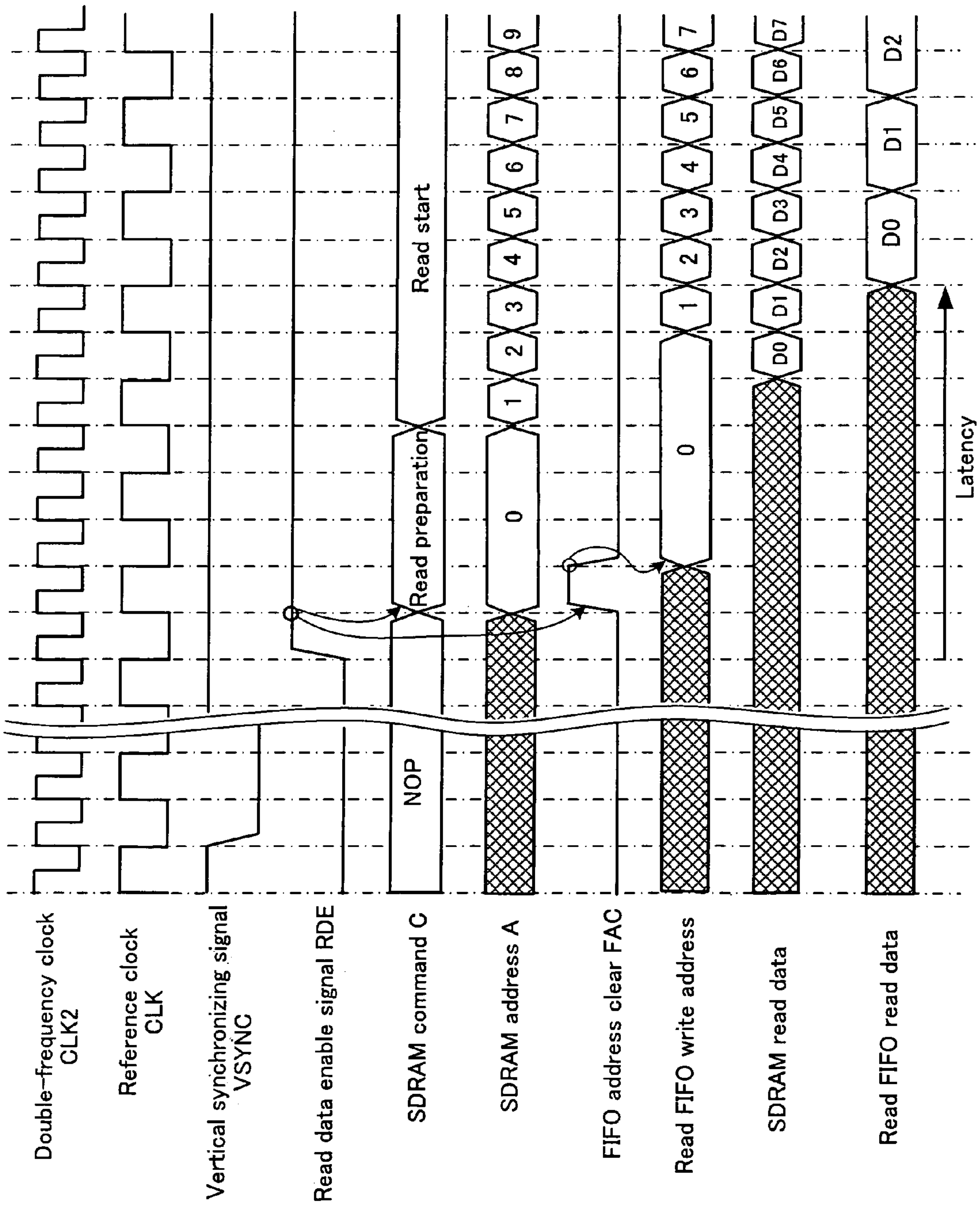
FIG. 7 is a timing chart showing operation of a comparative embodiment near a rising edge of read data enable signal.
Figure 8:
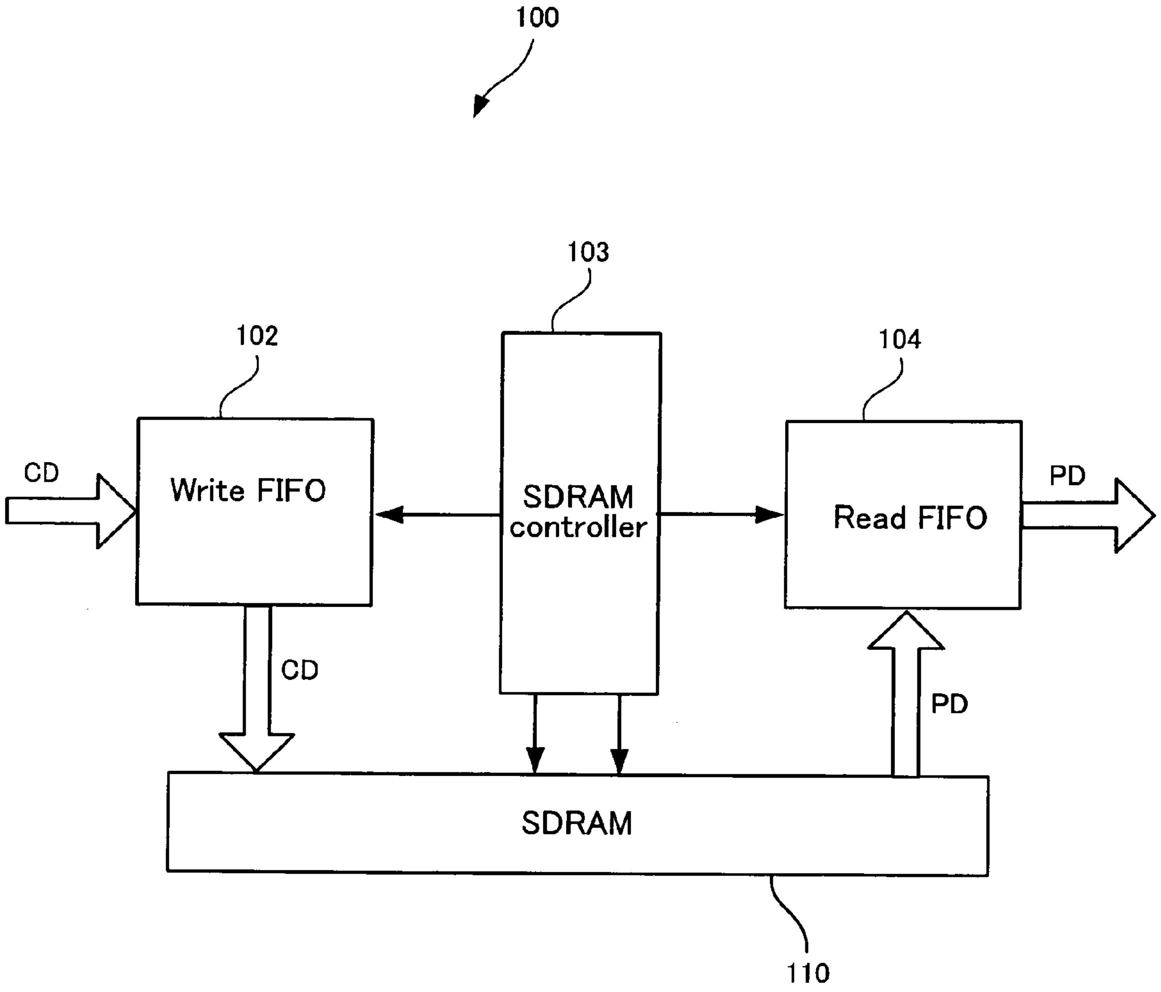
FIG. 8 is a schematic drawing showing construction of a conventional memory control circuit.
Figure 9:
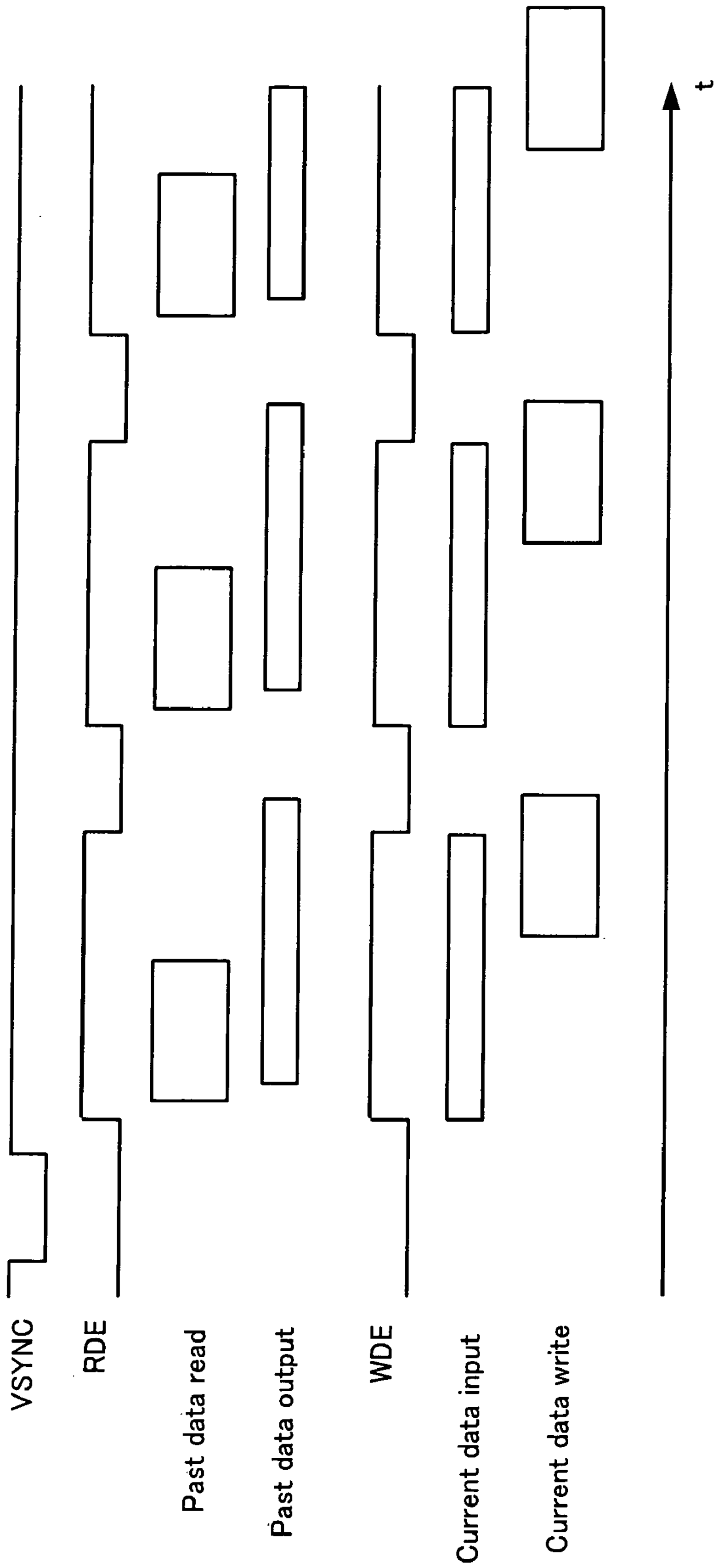
FIG. 9 is a timing chart showing access timings in the conventional memory control circuit shown in FIG. 8.

FIG. 7 is a timing chart showing an operation of a comparative example, or a conventional data processing apparatus, near the rising edge of read data enable signal RDE.

In the conventional data processing apparatus, reading of past data from SDRAM starts after detecting the change of read data enable signal RDE from 'L' level to 'H' level. That is, after detecting the change of read data enable signal RDE to 'H' level, the initial address (0) is supplied as Address A to SDRAM 10 together with Command C. FIFO address clear signal FAC for clearing Read FIFO to an initial address is also supplied. As a result, after a certain delay time, past data (D0, D1, . . . ) are successively read from SDRAM and written to read FIFO. After a further delay time, past data (D0, D1, . . . ) are read from Read FIFO and are output. Accordingly, latency from the rising edge of read data enable signal RDE to start outputting data is long, and the comparative example requires-a shift register with a large size to delay the current data during the long latency.

Methods of controlling frame memories, memory control circuits, and image processing apparatuses including the memory control circuits according to this disclosure are explained with reference to exemplary embodiments. The exemplary methods and memory control circuits enable to shorten the delay time to start outputting data, which represent values of pixels constituting the previous frame, previously stored in the frame memory. Accordingly, the exemplary image processing apparatuses may be constructed with delay circuits with small sizes.

In the exemplary embodiments explained above, data valid signal that is input together with data of pixels constituting each of the frames is used as a write data enable signal WDE and a read data enable signal RDE. Accordingly, read data enable signal RDE and write data enable signal WDE simultaneously become 'H' level and, during the period that these signals are in 'H' level, current data CD are input into the SDRAM interface 20. However, different exemplary embodiments of image processing apparatuses may utilize read data enable signal RDE and write data enable signal WDE that become 'H' level at different timings, depending on constructions of the image processing apparatuses.

For example, the exemplary SDRAM interface 20 may be modified to provide a compression circuit before Write FIFO 21 and decompression circuit after Read FIFO 23. In such a construction, current data CD input to an image processing apparatus are compressed and, thereafter, stored in SDRAM 10 through Write FIFO 21. Further, past data PD read through Read FIFO are decompressed and, thereafter, input to an image processing apparatus. In this case, current data input to the image processing apparatus reaches Write FIFO 21 after a delay time required to perform the compression in the compression circuit. Accordingly, data valid signal may be used as write data enable signal WDE after it is delayed for the delay time of the compression circuit. On the other hand, data valid signal may be used as read data enable signal RDE as it is.

Note that, even in such a construction, current data CD input to an image processing apparatus may be input to a shift register or a different delay circuit without being compressed. Then, after being delayed for a specified delay time, current data are input to the image processing circuit. That is, not depending on whether or not a compression circuit is provided before Write FIFO 21, inputting of current data CD to the delay circuit starts simultaneously with the start of inputting current data to the SDRAM interface.

What is claimed is:

1. A method of controlling a frame memory using a memory control circuit comprising:

receiving data representing values of pixels constituting each of a plurality of frames in an order of the frames, and supplying the data to the frame memory; and generating address signals that specify addresses of the frame memory to be accessed and control signals that command reading from or writing to the frame memory, and supplying the generated address and control signals to the frame memory such that data representing values of pixels constituting a previous frame previously written to the frame memory are read from the frame memory and data representing values of pixels constituting a next frame next to the previous frame are written to the frame memory, wherein the generating and supplying are performed such that the reading from the frame memory includes i) starting to read data representing values of pixels constituting a particular previous frame from the frame memory before the receiving of the data representing values of pixels constituting the next frame starts, ii) stopping to read data representing values of pixels constituting the particular previous frame from the frame memory when first data representing values of a portion of the pixels constituting the particular previous frame are read, and iii) re-starting to read data representing values of pixels constituting the particular previous frame from the frame memory after the receiving of the data representing values of pixels constituting the next frame starts.

2. The method according to claim 1, further comprising:

receiving a synchronizing signal before the receiving of data representing values of pixels constituting the next frame starts, wherein the generating and supplying include, when the synchronizing signal is received, generating a first address signal that specifies an initial address and a first control signal that commands reading, and supplying the first address and control signals such that the frame memory reads the first data from a first range of addresses starting from the initial address.

3. The method according to claim 1, wherein:

each of the plurality of frames includes a plurality of lines;

the receiving includes receiving data representing values of pixels constituting each of the plurality of lines in an order of the lines;

the first data represent values of pixels constituting a first portion of a first one of the plurality of lines of the previous frame; and the generating and supplying are performed such that data representing values of remaining pixels constituting a remaining portion of the first one of the plurality of lines of the previous frame and data representing values of pixels constituting the first portion of a second one of the plurality of lines of the previous frame are read during the receiving of data representing values of pixels constituting a first one of the plurality of lines of the next frame.

4. The method according to claim 3, further comprising:

receiving a synchronizing signal before the receiving of data representing values of pixels constituting the next frame starts, wherein the generating and supplying include:

when the synchronizing signal is received, generating a second address signal that specifies an initial address and a second control signal that commands reading, and supplying the second address and control signals such that the frame memory reads the first data from a second range of addresses including a first number of the addresses required to store the first data starting from the initial address; and after the receiving of data representing values of pixels constituting the first one of the plurality of lines of the next frame starts, generating at least a third address signal that specifies a starting address next to the second range of addresses and a third control signal that commands reading and supplying the third address and control signals such that the frame memory reads data from a third range of addresses including a specified number of addresses required to store data representing values of pixels constituting one of the plurality of lines starting from the starting address.

5. The method according to claim 4, wherein the generating and supplying further include:

after the receiving of data representing values of pixels constituting each of a second to a last one of the plurality of lines of the next frame starts, generating at least a fourth address signal that specifies a second starting address next to a range of addresses read after the receiving of data representing values of pixels constituting a previous one of the plurality of lines of the next frame starts and a fourth control signal that commands reading, and supplying the fourth address and control signals such that the frame memory reads data from a fourth range of addresses including the specified number of addresses starting from the second starting address.

6. The method according to claim 3, wherein the generating and supplying further include:

after data representing a value of a last one of the pixels constituting a last one of the plurality of lines of a frame previous to the previous frame is read, generating a fifth address signal that specifies an initial address and a fifth control signal that commands reading, and supplying the fifth address and control signals such that the frame memory reads data from a fifth range of addresses including a first number of addresses required to store the first data starting from the initial address; and after the receiving of data representing values of pixels constituting the first one of the plurality of lines of the next frame starts, generating at least a sixth address signal that specifies a third starting address next to the fifth range of addresses and a sixth control signal that commands reading, and supplying the sixth address and control signals such that the frame memory reads data from a sixth range of addresses including a specified number of addresses required to store data representing values of pixels constituting one of the plurality of lines starting from the third starting address.

7. The method according to claim 1, further comprising:

storing the first data read from the frame memory before the receiving of data representing values of pixels constituting the next frame starts in a FIFO; and reading the first data after the receiving of data representing values of pixels constituting the next frame starts from the FIFO.

8. The method according to claim 7, further comprising:

outputting the first data read from the FIFO to a processing circuit; and delaying the data representing values of pixels constituting the next frame to produce a delayed data, and outputting the delayed data to the processing circuit such that the processing circuit starts to receive the first data and the delayed data simultaneously.

9. A memory control circuit comprising:

a data input terminal that receives data representing values of pixels constituting each of a plurality of frames in an order of the frames;

a data supply terminal that supplies the data to the frame memory;

an address terminal that supplies address signals, which specify addresses of the frame memory to be accessed to the frame memory; and a control terminal that supplies control signals, which command reading from or writing to the frame memory, to the frame memory, wherein the memory control circuit generates and supplies the address and control signals to the frame memory such that:

data representing values of pixels constituting a previous frame previously written to the frame memory are read from the frame memory and data representing values of pixels constituting a next frame next to the previous frame are written to the frame memory; and the reading from the frame memory includes i) starting to read data representing values of pixels constituting a particular previous frame from the frame memory before the memory control circuit starts to receive the data representing values of pixels constituting the next frame, ii) stopping to read data representing values of pixels constituting the particular previous frame from the frame memory when first data representing values of a portion of the pixels constituting the particular previous frame are read, and iii) re-starting to read data representing values of pixels constituting the particular previous frame from the frame memory after the memory control circuit starts to receive the data representing values of pixels constituting the next frame.

10. The memory control circuit according to claim 9, further comprising:

a synchronizing terminal that receives a synchronizing signal before the memory control circuit starts to receive the data representing values of pixels constituting the next frame, wherein:

when the synchronizing signal is received, the memory control circuit generates a first address signal that specifies an initial address and a first control signal that commands reading, and supplies the first address and control signals to the frame memory such that the frame memory reads the first data from a first range of addresses starting from the initial address.

11. The memory control circuit according to claim 9, wherein:

each of the plurality of frames includes a plurality of lines;

the memory control circuit receives data representing values of pixels constituting each of the plurality of lines in an order of the lines;

the first data represent values of pixels constituting a first portion of a first one of the plurality of lines of the previous frame; and the memory control circuit generates and supplies the address and control signals to the frame memory such that data representing values of remaining pixels constituting a remaining portion of the first one of the plurality of lines of the previous frame and data representing values of pixels constituting the first portion of a second one of the plurality of lines of the previous frame are read during a period that the memory control circuit receives data representing values of pixels constituting a first one of the plurality of lines of the next frame.

12. The memory control circuit according to claim 11, further comprising:

a synchronizing terminal that receives a synchronizing signal before the memory control circuit starts to receive the data representing values of pixels constituting the next frame, wherein:

when the synchronizing signal is received, the memory control circuit generates a second address signal that specifies an initial address and a second control signal that commands reading and supplies the second address and control signals such that the frame memory reads the first data from a second range of addresses including a first number of addresses required to store the first data starting from the initial address; and after the memory control circuit starts to receive the data representing values of pixels constituting the first one of the plurality of lines of the next frame, the memory control circuit generates at least a third address signal that specifies a starting address next to the second range of addresses and a third control signal that commands reading and supplies the third address and control signals such that the frame memory reads data from a third range of addresses including a specified number of addresses required to store data representing values of pixels constituting one of the lines starting from the starting address.

13. The memory control circuit according to claim 12, wherein:

after the memory control circuit starts to receive data representing values of pixels constituting each of a second to a last one of the plurality of lines of the next frame, the memory control circuit generates at least a fourth address signal that specifies a second starting address next to a range of addresses read after the memory control circuit starts to receive data representing values of pixels constituting a previous one of the plurality of lines of the next frame and a fourth control signal that commands reading and supplies the fourth address and control signals such that the frame memory reads data from a fourth range of addresses including the specified number of addresses starting from the second starting address.

14. The memory control circuit according to claim 11, wherein:

after data representing a value of a last one of the pixels constituting a last one of the plurality of lines of a frame previous to the previous frame is read from the frame memory, the memory control circuit generates a fifth address signal that specifies an initial address and a fifth control signal that commands reading and supplies the fifth address and control signals such that the frame memory reads data from a fifth range of addresses including a first number of addresses required to store the first data starting from the initial address; and after the memory control circuit starts to receive the data representing values of pixels constituting the first one of the plurality of lines of the next frame, the memory control circuit generates at least a sixth address signal that specifies a third starting address next to the fifth range of addresses and a sixth control signal that commands reading and supplies the sixth address and control signals such that the frame memory reads data from a sixth range of addresses including a specified number of addresses required to store data presenting values of pixels constituting one of the plurality of lines starting from the third starting address.

15. The memory control circuit according to claim 9, further comprising:

a FIFO, wherein the memory control circuit stores the first data read from the frame memory before the memory control circuit starts to receive the data representing values of pixels constituting the next frame in the FIFO, and reads the first data after the memory control circuit starts to receive the data representing values of pixels constituting the next frame from the FIFO.

16. An image processing apparatus, comprising:

a frame memory;

a memory control circuit comprising:

a data input terminal that receives data representing values of pixels constituting each of a plurality of frames in an order of the frames, and a data supply terminal that supplies the data to frame memory; and an address terminal that supplies address signals, which specify addresses of the frame memory to be accessed, to the frame memory and a control terminal that supplies control signals, which command reading from or writing to the frame memory, to the frame memory; and an image processing circuit, wherein:

the memory control circuit generates and supplies the address and control signals to the frame memory such that data representing values of pixels constituting a previous frame previously written to the frame memory are read from the frame memory and data representing values of pixels constituting a next frame next to the previous frame are written to the frame memory;

the image processing circuit receives the data representing values of pixels constituting the next frame and the data representing values of pixels constituting the previous frame read from the frame memory, and performs processing using both of the data; and the memory control circuit further generates and supplies the address and control signals to the frame memory such that the reading from the frame memory includes i) starting to read data representing values of pixels constituting a particular previous frame from the frame memory before the memory control circuit starts to receive the data representing values of pixels constituting the next frame, ii) stopping to read data representing values of pixels constituting a particular previous frame from the frame memory when first data representing values of a portion of the pixels constituting the particular previous frame are read, and iii) re-starting to read data representing values of pixels constituting the particular previous frame from the frame memory after the memory control circuit starts to receive the data representing values of pixels constituting the next frame.

17. The image processing apparatus according to claim 16, wherein:

the memory control circuit further comprising a synchronizing terminal that receives a synchronizing signal before the memory control circuit starts to receive the data representing values of pixels constituting the next frame; and when the synchronizing signal is received, the memory control circuit generates a first address signal that specifies an initial address and a first control signal that commands reading, and supplies the first address and command signals to the frame memory such that the frame memory reads the first data from a first range of addresses starting from the initial address.

18. The image processing apparatus according to claim 16, wherein:

each of the plurality of frames includes a plurality of lines;

the memory control circuit receives data representing values of pixels constituting each of the plurality of lines in an order of the lines;

the first data represent values of pixels constituting a first portion of a first one of the plurality of lines of the previous frame; and the memory control circuit generates and supplies the address and control signals to the frame memory such that data representing values of remaining pixels constituting a remaining portion of the first one of the plurality of lines of the previous frame and data representing values of pixels constituting the first portion of a second one of the plurality of lines of the previous frame are read during a period that the memory control circuit receives data representing values of pixels constituting a first one of the plurality of lines of the next frame.

19. The image processing apparatus according to claim 18, wherein:

the memory control circuit further comprising a synchronizing terminal that receives a synchronizing signal before the memory control circuit starts to receive the data representing values of pixels constituting the next frame;

when the synchronizing signal is received, the memory control circuit generates a second address signal that specifies an initial address and a second control signal that commands reading and supplies the second address and control signals such that the frame memory reads the first data from a second range of addresses including a first number of the addresses required to store the first data starting from the initial address; and after the memory control circuit starts to receive the data representing values of pixels constituting the first one of the plurality of lines of the next frame, the memory control circuit generates at least a third address signal that specifies a starting address next to the second range of addresses and a third control signal that commands reading and supplies the third address and control signals such that the frame memory reads data from a third range of addresses including a specified number of the addresses required to store data representing values of pixels constituting one of the plurality of lines starting from the starting address.

20. The image processing apparatus according to claim 16, wherein:

the memory control circuit further comprises a FIFO; and the memory control circuit stores the first data read from the frame memory before the memory control circuit starts to receive the data representing values of pixels constituting the next frame in the FIFO, and reads the first data after the memory control circuit starts to receive the data representing values of pixels constituting the next frame from the FIFO.

21. The image processing apparatus according to claim 20, further comprising:

a delay circuit that delays the data representing values of pixels constituting the next frame to produce a delayed data, wherein the image processing circuit starts to receive the delayed data and the first data read from the FIFO simultaneously.

* * * * *